United States Patent [19]

Hoshi

[11] Patent Number: 5,027,346
[45] Date of Patent: Jun. 25, 1991

[54] NODE APPARATUS FOR PARALLEL COMMUNICATION

[75] Inventor: Kazunori Hoshi, Yokohama, Japan

[73] Assignee: Ricoh Company, Ltd., Tokyo, Japan

[21] Appl. No.: 290,429

[22] Filed: Dec. 27, 1988

[30] Foreign Application Priority Data

Dec. 24, 1987 [JP] Japan .............................. 62-325586

[51] Int. Cl.$^5$ .............................................. H04J 3/14
[52] U.S. Cl. ..................................... 370/58.2; 370/60; 370/94.1
[58] Field of Search ........................ 370/60, 94.1, 94.3, 370/58.1, 58.2, 58.3

[56] References Cited

U.S. PATENT DOCUMENTS

| | | | |
|---|---|---|---|
| 4,399,531 | 8/1983 | Grande et al. | 370/60 |
| 4,782,485 | 11/1988 | Gollub | 370/60 |
| 4,837,761 | 6/1989 | Isono et al. | 370/60 |
| 4,839,887 | 6/1989 | Yano | 370/60 |

Primary Examiner—Douglas W. Olms
Assistant Examiner—Min Jung
Attorney, Agent, or Firm—Oblon, Spivak, McClelland, Maier & Neustadt

[57] ABSTRACT

A node apparatus for use in a parallel communication network having an indefinite architecture. The node apparatus is capable of establishing one or more communication paths at the same time and passing parallel data without conversion to a serial data. The node apparatus includes a plurality of input ports, each including the same number of input channels, a like plurality of output ports, each including the same number of output channels, and a connection circuit connected between the input and output ports. Under the control of a control circuit, one of an input ports is connected to a selected one of the output ports by the connection circuit, in which all of the input channels of the input port are connected to respective output channels of the selected output port. Additionally, one or more input ports not in use may be connected to one or more other output ports not in use at the same time. One of the input channels in the input port may be defined as a main input channel and a connection of the input port to one of the output ports may be controlled by an input signal input into the main input channel.

7 Claims, 6 Drawing Sheets

NODE APPARATUS FOR PARALLEL COMMUNICATION

BACKGROUND OF THE INVENTION

1. Field of the Invention

This invention generally relates to a parallel data communication system, and, in particular, to a node apparatus for use in such a parallel data communication system. More specifically, the present invention relates to a multi-connection, parallel transmission type node apparatus capable of establishing one or more parallel data transmission paths therethrough.

2. Description of the Background

A multi-junction type node apparatus having a plurality of paired input and output channels is well known and disclosed in Japanese Patent Laid-open Pub. No. 58-139543 which corresponds to U.S. Pat. No. 4,516,272 issued to T. Yano on May 7, 1985 and assigned to the assignee of this application, which is hereby incorporated by reference. The multi-junction type node apparatus disclosed in the above-mentioned U.S. patent receives a plurality of input signals at its plurality of input channels and selects the one which has arrived at the node first and thus the input signals are selected on a first-come-first-served basis.

A communication system including a plurality of similar multi-junction type node apparatuses, each of which is capable of establishing one or more transmission paths therethrough, is disclosed in Japanese Patent Laid-open Pub. No. 61-218026 which corresponds to application U.S. Pat. No. 96532, filed Sept. 15, 1987 and assigned to the assignee of this application, which is also hereby incorporated by reference. In accordance with the teachings of this U.S. patent application, there is provided a node apparatus including a plurality of input and output channels which are normally connected through respective connection gates in a stand-by condition. Upon detection of the arrival of a first input signal at one of the input channels, the connection gates of the other channels are disconnected to thereby prevent the occurrence of a loss of a packet. Each node apparatus is so structured that, when one of the input channels has detected the arrival of an input signal for the first time, an active signal is returned to the corresponding output channel.

A communication system defined by using a plurality of node apparatuses proposed in either of the above-mentioned patents is not limited to any specific architecture, such as a loop or star, and it may take any desired architecture or a combination of two or more of any well-known architectures. Thus, such a communication system has a significant flexibility and adaptation and an expansion or contraction of the system can be carried out virtually without limitation. However, the communication systems of the above-mentioned patents are of the serial transmission type so that a conversion between parallel and serial data is required in order to support parallel transmission.

SUMMARY OF THE INVENTION

In accordance with the present invention, there is provided a multi-junction parallel transmission type node apparatus capable of establishing one or more transmission paths therethrough, each being capable of transmitting parallel data. Thus, there is provided a node apparatus for connection with another node apparatus or a terminal apparatus, such as a computer system. The node apparatus includes a plurality of input means, a plurality of output means, each being of which corresponds to one of the plurality of input means, and a connection control means for controlling a connection between the input and output means. The control means includes a means for determining an input means which has received an input signal first among those input means which are not currently in use or in a stand-by condition. Then, under the control of the control means, each of the input means in the stand-by condition is connected to all of the output means in the stand-by condition excepting at least the corresponding output means. Then, in accordance with a determination by a means for determining, all of the input means excepting the one determined by said means for determining are disconnected from the output means, whereby a signal is transferred from said determined input means to all of the output means in the stand-by condition excepting the one corresponding to the determined input means.

In accordance with the present invention, the plurality of input means is divided into a plurality of groups, each including a first predetermined number of input means, and the plurality of output means is also divided into a plurality of groups, each including a second predetermined number preferably equal to the first predetermined number, of output means. And, one group of input means is operatively coupled to one group of output means selectively under the control of the connection control means. Thus, when such a connection is made to establish a transmission path through the node apparatus, there is defined a parallel transmission path capable of transmitting parallel data at the same time. In the preferred embodiment, such a connection between one group of input means and one group of output means is established when at least one of the input means of the group has received an input signal under the control of the connection control means.

It is therefore a primary object of the present invention to obviate the disadvantages of the prior art as described above and to provide an improved node apparatus for data communication network.

Another object of the present invention is to provide an improved node apparatus capable of establishing a parallel transmission path therethough at the same time.

A further object of the present invention is to provide an improved node apparatus capable for use in a parallel data transmission network.

A still further object of the present invention is to provide an improved node apparatus capable of passing parallel data therethrough without conversion to a corresponding serial data.

A still further object of the present invention is to provide an improved node apparatus having a high data rate and flexibility in constructing communication network.

Other objects, advantages and novel features of the present invention will become apparent from the following detailed description of the invention when considered in conjunction with the accompanying drawings.

DESCRIPTION OF THE PREFERRED EMBODIMENTS

Figure 6:
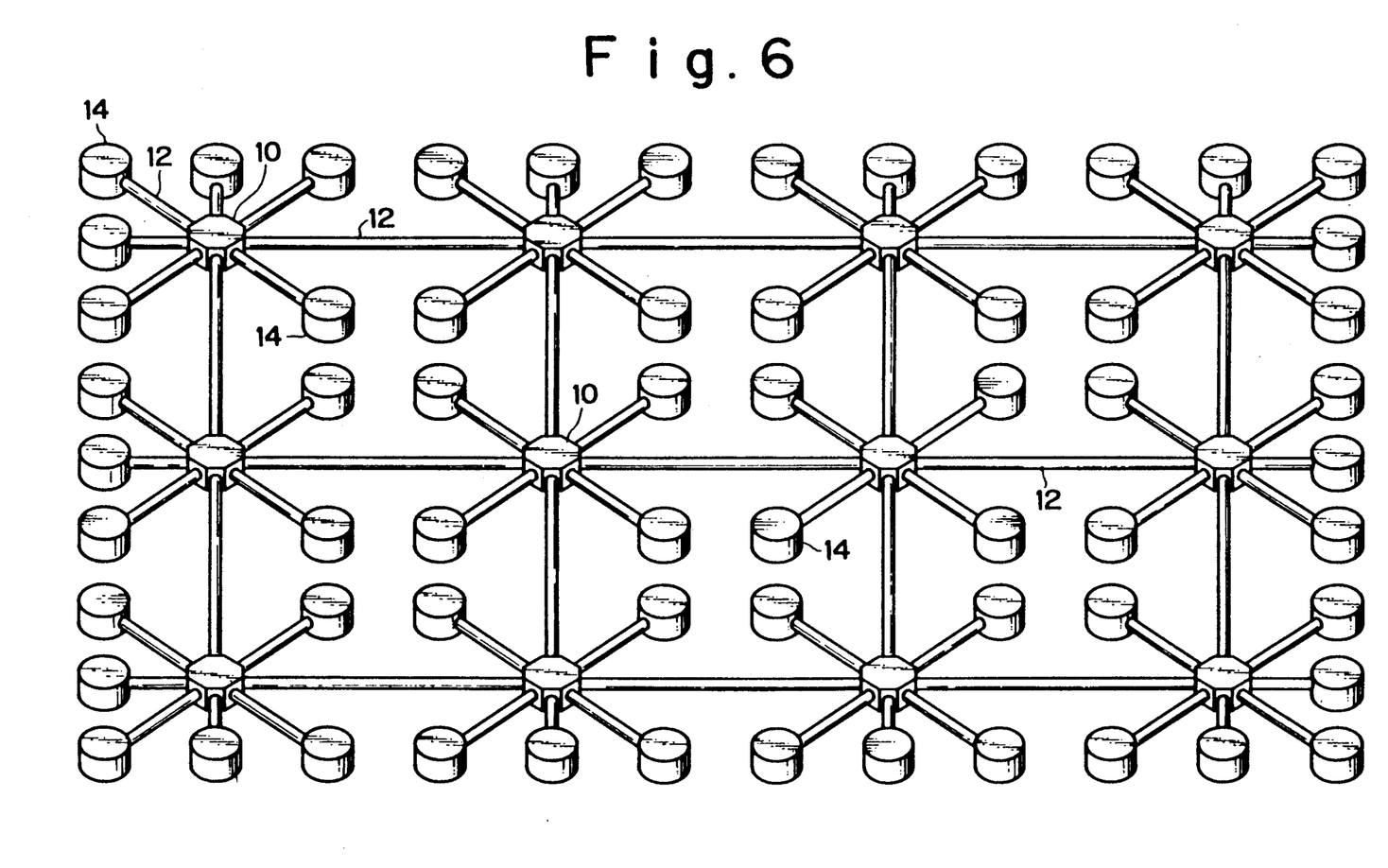
FIG. 6 is a schematic illustration showing an example of a communication network which may be constructed using node apparatuses of the present invention.

Referring first to FIG. 6, there is shown a communication network which may be constructed using the node apparatuses of the present invention. In the illustrated embodiment, a plurality of node apparatuses of the present invention are interconnected by transmission lines 12 to define a communication network having a lattice architecture. It is to be noted that a communication network defined by using the present node apparatuses may have any other desired architecture, such as a star, a loop or a line, and it may have a two dimensional or three dimensional structure. In other words, a communication network which may be built by the present node apparatuses is inherently flexible in its architecture and it can be freely expanded or contracted even after a communication network has been built.

A node apparatus constructed in accordance with the present invention has a plurality of input channels and a plurality of output channels. In the illustrated embodiment, the node apparatus 10 includes 8 input and output channels. Each of the output channels of a node apparatus 10 is connected to the input channel of another node apparatus 10 or a terminal apparatus 14, such as a computer system. Any desired number of input and output channels may be provided to each of the node apparatuses 10. However, preferably, each of the node apparatuses 10 has equal number of input and output channels. Any desired number of node apparatuses 10 or terminal apparatuses 14 may be connected to a particular node apparatus 10 within the limit of the number of the maximum input and output channels. It should also be noted that, if desired, a whole communication network may be constructed by a single node apparatus 10, or a plurality of node apparatuses 10 may be mounted on a single printed circuit board to thereby define an integrated node apparatus board having an increased number of input and output channels.

The terminal apparatus 14 may be of the type which can transmit and receive data asynchronously, and it may be selected from various apparatuses including processing systems, such as a personal computer, and service stations, such as a file station and a print station. It is to be noted that the terminal apparatus 14 may differ in structure and/or function from one another at least partly and the terminal apparatus 14 may be provided for only selected node apparatuses 10. Data is transmitted, preferably, in the form of packets in the present communication network, although the present invention should not be limited only to this. As will be described in detail later, if the terminal apparatus 14 is of the full-duplex type, it is preferably structured to send out a response signal immediately upon receipt of a packet of an input signal addressed thereto.

The transmission line 12 may, for example, be comprised of an optical transmission line, such as optical fibers, or an electrical transmission line, such as a twisted pair or a coaxial cable, and data may be transmitted in the form of either analog or digital data. In the present embodiment, a full-duplex transmission structure is adopted for a node-to-node connection, and the transmission path between the node apparatus 10 and the terminal apparatus 14 may take either a full-duplex structure or a half-duplex structure. In addition, more than one transmission line 12 may be provided between any two adjacent node apparatuses 10 depending on the level of traffic therebetween.

Figure 1:
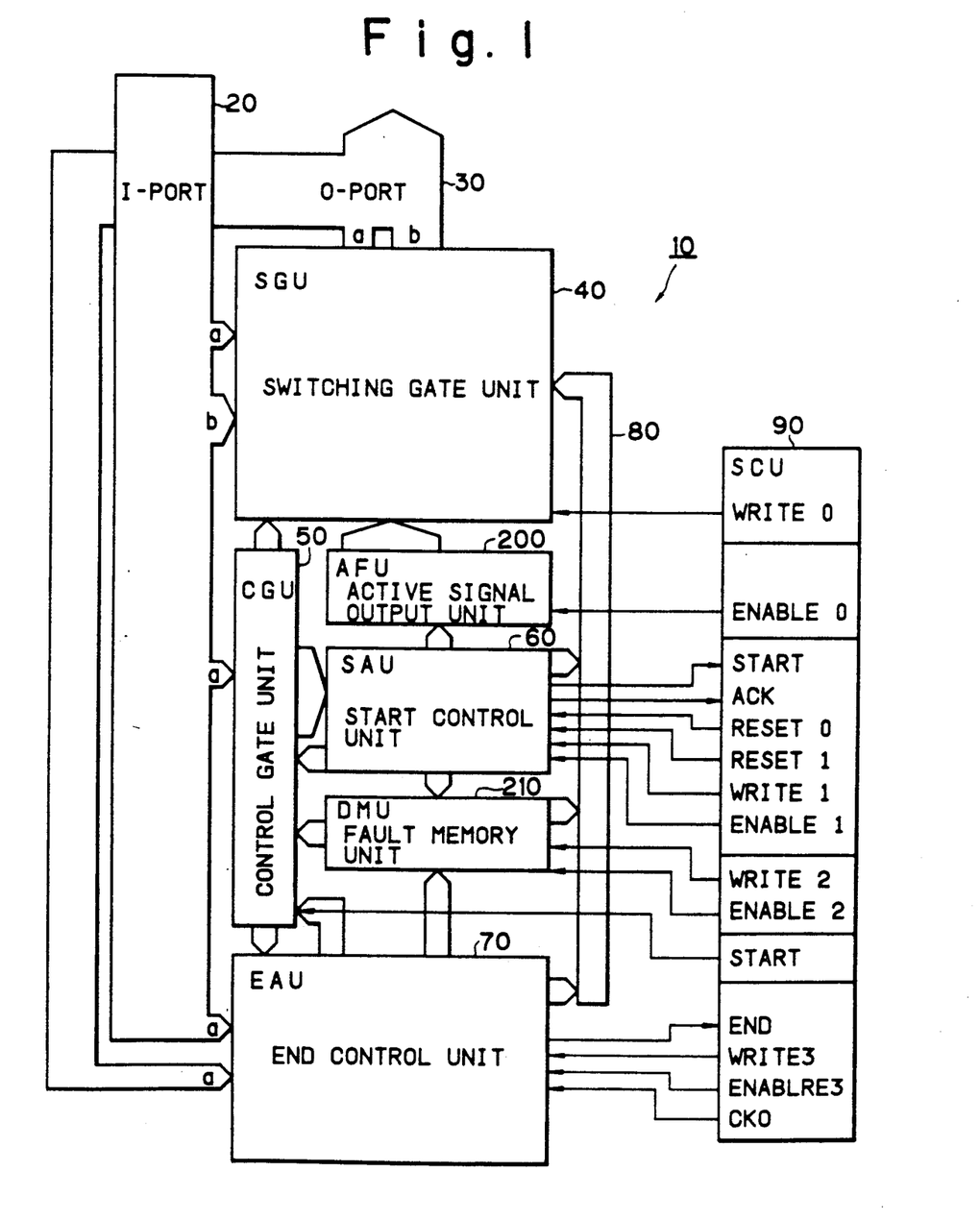
FIG. 1 is a block diagram showing a node apparatus constructed in accordance with one embodiment of the present invention.

Referring now to FIG. 1, there is shown in block form the overall structure of the node apparatus 10 provided in the communication network shown in FIG. 6. As illustrated, the node apparatus 10 includes an input port (I-PORT) 20, to which receiving lines of a transmission path 12 are connected, and an output port (O-PORT) 30, to which transmitting lines of the transmission path 12 are connected. The input and output ports 20 and 30 are interconnected through a switching gate unit (SGU) 40. In the illustrated embodiment, the input port 20 includes 8 receiving or input channels and correspondingly the output port 30 includes 8 transmitting or output channels. With this structure, a particular node apparatus 10 may be connected to up to eight other apparatuses, including node apparatuses 10 and terminal apparatuses 14, through eight transmission paths 12, respectively. In this case, each of the output channels of a particular node apparatus 10 is connected to a corresponding input channel of another node apparatus 10 or a terminal apparatus 14 through a transmission path 12.

The switching gate unit 40 is a gate circuit for selectively establishing an internal connection between the input channels and the output channels of the node apparatus 10. The input port 20 is connected to a start control unit (SAU) 60 and to an end control unit (EAU) 70 through a control gate unit (CGU) 50. The control gate unit 50 is a gate circuit which controls the transfer of a control signal from the input port 20 to the start control unit 60 and also the transfer of a control signal from any of the start control unit 60, a fault memory unit (DMU) 210 or the end control unit 70 to the switching gate unit 40 and/or to the end control unit 70. The start control unit 60 serves to determine or discriminate an input channel which has received an input signal first and also to detect whether or not an input signal has been input to each of the input channels. The end control unit 70 serves to detect the fact that an input signal has disappeared from the input and output channels of a communication path established through the node apparatus 10 and then to carry out an end or termination processing of the communication. The switching gate unit 40, start control unit 60 and end control unit 70 are operatively interconnected through a gate set bus 80 one from another.

The switching gate unit 40 is also connected to an active signal output unit (AFU) 200 for outputting an active signal, which is also connected to the start control unit 60. A fault memory unit (DMU) 210 is also connected to the start control unit 60 and to the end control unit 70 and serves to store the information of channels which malfunction. The fault memory unit 210 is also connected to the gate set bus 80. All of the switching gate unit 40, control gate unit 50, start control unit 60, end control unit 70, active signal output unit 200 and fault memory unit 210 are controlled by a sequence control unit (SCU) 90 which is in charge of the overall control of the present node apparatus 10.

Figures 2, 2A:
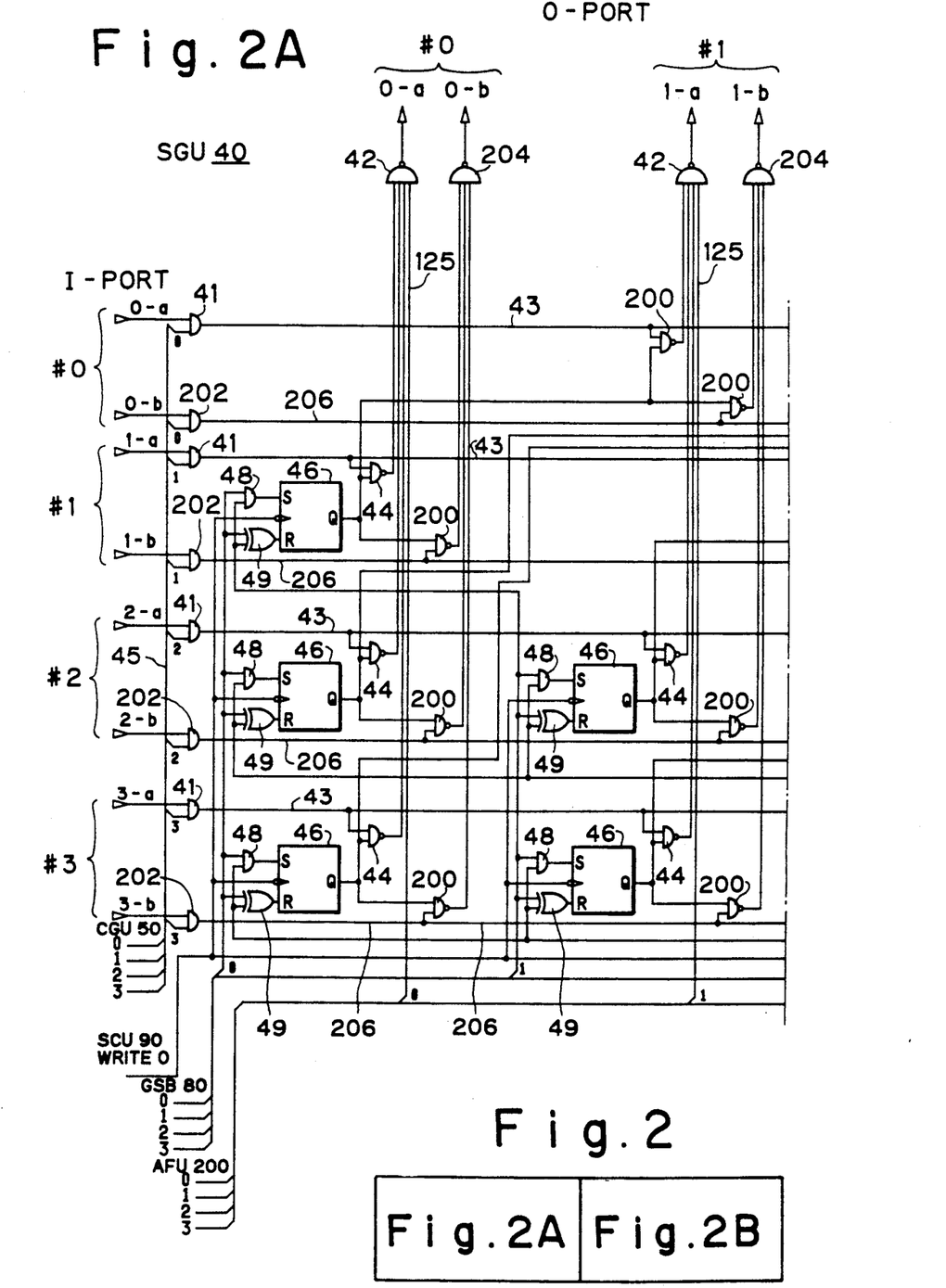
FIG. 2, 2A, and 2B are logic circuit diagrams showing the detailed structure of one example of the switching gate unit 40 provided in the node apparatus of FIG. 1.
Figure 2B:
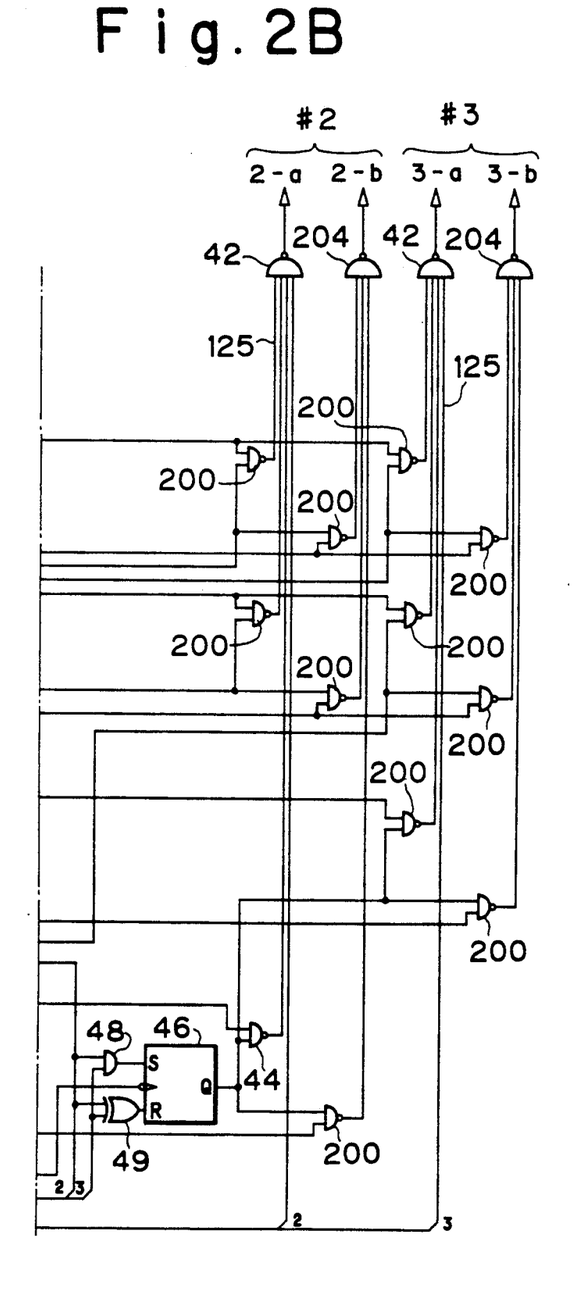

FIG. 2 illustrates a specific structure of the switching gate unit 40. As shown, in the present embodiment, the input port I-PORT includes four sub-input ports #0 through #3, each of which includes two input channels, and the output port O-PORT includes four sub-output ports #0 through #3, each of which includes two output channels. Thus, the input port has eight input channels which are grouped into four sub-input ports, each having two input channels, and, similarly, the output port has eight output channels which are grouped into four sub-output ports, each having two output channels. Accordingly, in the present embodiment, the output port O-PORT of the switching gate unit 40 includes four 4-input NAND gates 42 which have an input terminal connected to a signal line 125 extending from the active signal output unit 200. In this structure, two bits of data can be transmitted in parallel using two signal lines at the same time. The present embodiment allows the parallel transmission of two bits of data carried out using a pair of signal lines a and b. Since each of the input and output ports includes four pairs of signal lines, up to eight bits of data can be transmitted in parallel. It is to be noted that the switching gate unit 40 should not be limited to the particular structure shown in FIG. 2, and it may be modified to carry out the parallel transmission of any desired number of bits of data.

As shown in FIG. 2, the switching gate unit 40 includes $4 \times (4-1)$ number of 2-input NAND gates 44 and an equal number of 2-input NAND gates 200. The switching gate unit 40 also includes $4 \times (4-1)/2$ number of SR flip-flops 46, an equal number of AND gates 48 and an equal number of exclusive OR (EXOR) gates 49 connected as shown. As shown in FIG. 2, the switching gate unit 40 includes a port which is divided into a plurality of sub-ports, each having a predetermined number of signal lines. In the illustrated embodiment, each of the input and output ports is divided into four sub-ports, each of which includes two kinds of signal lines a and b. Described more in detail in this respect, a sub-input port #0 includes two input signal lines 0-a and 0-b as a set or unit and up to two bits of data can be transmitted in parallel through this sub-input port #0. Similarly, there are provided four sub-output ports #0 through #3 in the output port O-PORT, and, for example, sub-output port #0 includes a set or unit of two output signal lines 0-a and 0-b which allow to transmit up to two bits of data in parallel.

As will become more clear later, the present embodiment is so structured that signal line a serves as a main signal line and signal line b as an auxiliary signal line as far as a signal transmission function is concerned. The node apparatus 10 of the present embodiment, is so structured that signals carried on signal lines a are used for all of the units other than the switching gate unit 40 through the input and output ports of the switching gate unit 40 and signals carried on signal lines b are not used (see FIG. 1). Thus, all of the units other than the switching gate unit 40 of the node apparatus 10 are operatively associated with the signals carried on the main signal lines a of the input and output ports of the switching gate unit 40 and not with the signals carried on the auxiliary signal lines b. Thus, all of the units of the node apparatus 10 other than the switching gate unit 40 have nothing to do with the signals carried on the auxiliary signal lines b and are quite indifferent as to the presence of signals and their number. It is so structured that switching of each of the auxiliary signal lines b is carried out in response to the switching of the associated main signal line a.

Described in more detail in this respect, the main signal line a of a particular sub-input port, e.g., sub-input port #0, is connected to one input terminal of a 2-input AND gate 41 having an output line 43 which is commonly connected to one input terminal of a 4-input NAND gate 42 of each of all of the sub-output ports excepting the corresponding sub-output port, e.g., sub-output port #0, through an associated NAND gate 44. Since the input port includes four sub-input ports #0 through #3 in the present embodiment, the input port includes four 2-input AND gates 41, one for each of the four sub-input ports #0 through #3. Each of the sub-input ports also includes an auxiliary signal line b which is connected to one input terminal of a 2-input AND gate 202 which has an output line 206 commonly connected to one input terminal of a three-input NAND gate 204 of each of all of the sub-output ports excepting the corresponding sub-output port through an associated NAND gate 200. The remaining input terminals of all of the 2-input AND gates 41 and 202 of the input port are all commonly connected to a control line 45 which extends from the control gate unit 50. Thus, when the control line 45 is energized under the control of the control gate unit 50, the input port 20 and the internal circuit of the switching gate unit 40 are selectively interconnected.

With the sub-input and sub-output ports or channels to be interconnected being selected and the control lines of the thus selected channels of the gate set bus 80 being set at high level, the switching gate unit 40 establishes an interconnection between the input and output ports in response to a negative input clock signal WRITE 0 from the sequence control unit 90. The connections between the selected and unselected channels are disconnected. And, in this case, the previous connection conditions of the unselected channels are left intact. Thus, in the present node apparatus 10, one or more interconnections between the input and output channels or sub-input and sub-output ports (i.e., multi-channel connection) may be established at the same time. In other words, one or more different transmission paths may be established at the same time through the node apparatus 10. This is advantageous in increasing the use rate of each of the node apparatuses 10 in a communication network and thus in increasing the number of possible transmission paths which may be established at the same time in the same communication network. In this manner, in accordance with the present embodiment, the conditions of all of the NAND gates 44 and 200 can be set by one control operation, and the number of means for holding the desired status of each of the NAND gates 44 and 200, or flip-flops 46 in the present example, may be minimized.

Figure 3:
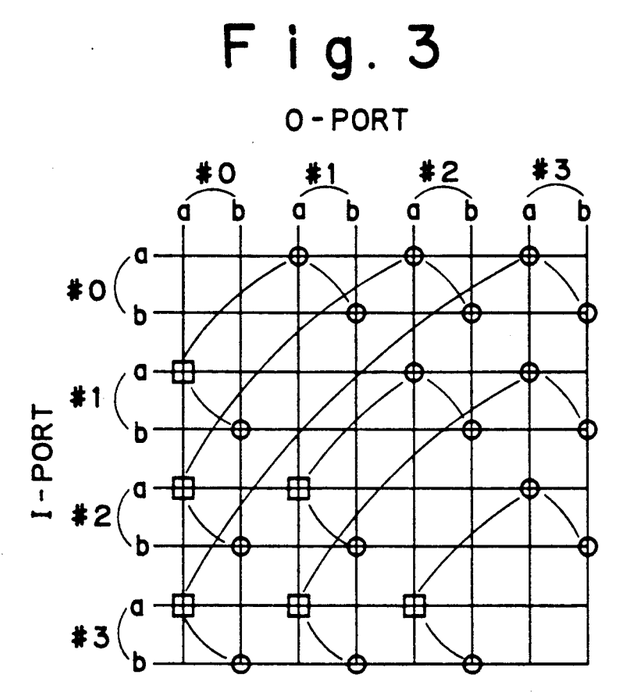
FIG. 3 is an illustration which will be useful for understanding the function of the switching gate unit 40 provided in the node apparatus of FIG. 1.

The function of the switching gate unit 40 may be better understood once reference is made to FIG. 3, in which horizontal and vertical lines indicate the signal lines of the switching gate unit 40 and the horizontal lines correspond to the signal lines connected to the input port with the vertical lines corresponding to the signal lines connected to the output port. Rectangles and circles indicated at selected intersections between the horizontal and vertical lines indicate the presence of a switch and its type. A rectangle indicates a switch including the NAND gate 44 of the switching gate unit 40, AND gate 48, EXOR gate 49 and SR flip-flop 46, and circles indicate other NAND gates 200. An intersection between the horizontal and vertical lines where no such mark is present indicates that no switch is provided at this intersection. If such a switch is in a conductive state, then the associated horizontal and vertical lines are interconnected and thus a signal input at the input port is connected to the output port through the horizontal and vertical lines and the switch which is now conductive.

As indicated by solid curved lines in FIG. 3, those switches which are located symmetrically with respect to a diagonal line extending from top left to bottom right and on associated pair of signal lines a and b are always operated at the same time. Thus, in general, it may be so structured that an SR flip-flop 46 is provided at each and every one of the intersections between the horizontal and vertical lines so as to hold the status of each of the switches. However, in the present embodiment, only one flip-flop as a memory element is provided at one of a set of such intersections and not at others. And, since it is not necessary to return the input signal to its own channel, no flip-flops are provided at the intersections along the diagonal line. This significantly simplifies the circuit structure of the switching gate unit 40.

Figure 4:
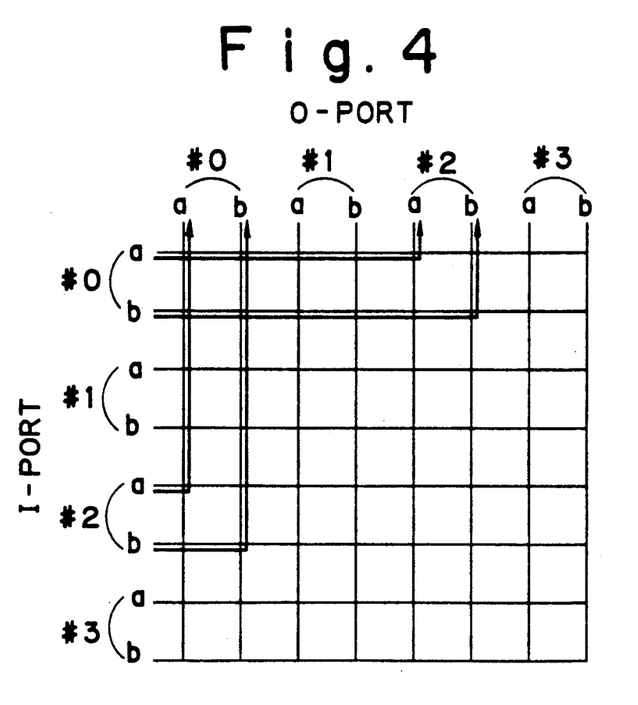
FIG. 4 is an illustration showing a particular input port has been connected to a particular output port in the switching gate unit 40 provided in the node apparatus of FIG. 1.

FIG. 4 illustrates the condition in which selected two sub-ports of the input and output ports are interconnected through the switching gate unit 40. In this case, sub-ports #0 and #2 are interconnected.

The present node apparatus 10 includes an active signal output unit 200 which serves to output an "active signal" indicating the fact that its node apparatus 10 and its input and output channels are in a normal operative condition. No constraints are imposed on this active signal except its signal length, which is set to be longer than a minimum time required to operate a flip-flop of the start control circuit 60 and shorter than a length obtained by subtracting a link time constant from a later-described first predetermined time length. The start control unit 60 includes a first arrived input signal detecting section and an input signal detecting section. The first arrived input signal detecting section is a section for determining or discriminating an input channel which has received an input signal in the first place in accordance with a first-come-first served logic. And, the input signal detecting section is a circuit for detecting whether or not an input signal has arrived at the input port 20.

The sequence control unit 90 controls first and second predetermined time periods. The first predetermined time period corresponds to a sum of a "link time constant" and an "active detection time constant" and it is the time which starts upon detection of a first return signal from the same transmission source and which detects the presence of a faulty or malfunctioning port (channel) by detecting a first return signal which has travelled along a different communication path and determining the presence or absence of arrival of an active signal. And, its length is set to be substantially equal to a sum between a propagation delay time for propagating back and forth over a maximum allowable distance between two adjacent node apparatuses 10 or between a node apparatus 10 and a terminal apparatus 14 and a time period required for an active signal. And, typically, a slight margin is added to this time period. The active signal terminated within this time period. The second predetermined time period, i.e., input signal detection time constant, starts from the end of the first predetermined time period and it is a signal detection time of another first return signal which has collided with another first return signal which has travelled along a different communication path, and, thus, the active signal is terminated. For example, it has a time length of one bit in the case of Manchester coding or of seven bits or more in the case of a coding method in which "0" is inserted in a series of six bits of "1" in a NRZI format. Typically, a slight margin is added and the time length is set to be twice thereof, i.e., 2 bits or 14 bits.

A completion of communication is determined by detecting the absence of a signal or the continuation of a predetermined logical condition over a time period determined by the communication end detection time constant at the end control unit 70. The "communication end detection time constant", i.e., third predetermined time period, is a signal detection time period for detecting incomplete communication in the case of full-duplex communication and completion of communication because no more signals follows after the return or forward signal. And, its length takes one bit in the case of Manchester coding or seven bits of more in the case of a coding method in which "0" is inserted in a series of six bits of "1" in a NRZI format. Typically, a time length is set as twice of these, i.e., 2 bits or 14 bits. And, typically, a slight margin is added to this time length.

In the present embodiment, "network time constant", i.e., fourth predetermined time period, is a time period required for detecting the presence or absence of a signal in order to detect cancellation or completion of communication in the case including half-duplex communication or a combination of full-duplex communication and half-duplex communication. Its length is set to be substantially equal to a sum between a propagation delay time period required to travel back and forth over a maximum effective network length and a time period required for a terminal apparatus to transmit a forward or return signal after having started to receive a return or forward signal. Typically, a slight margin is added to this length.

Figure 5:
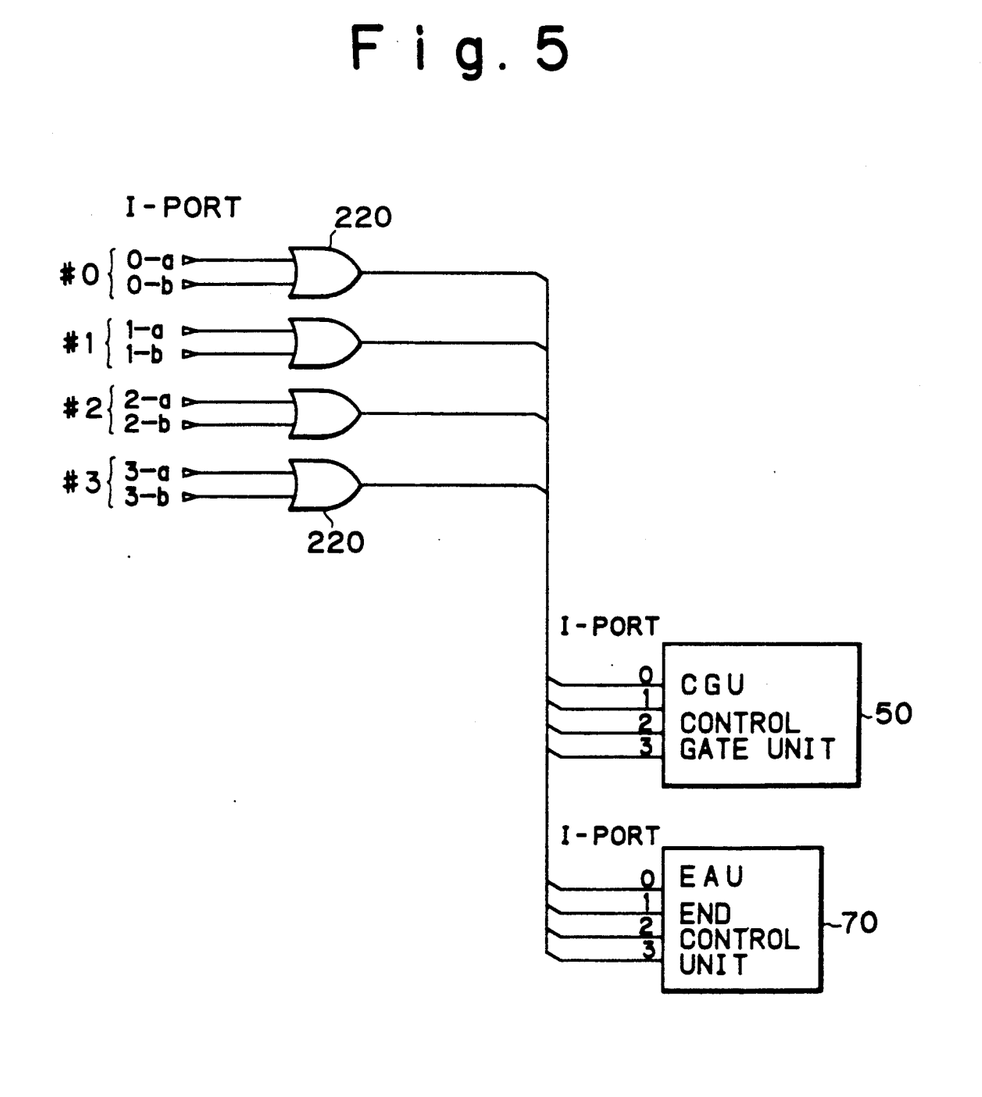
FIG. 5 is a block diagram showing partly in logic symbols an embodiment in which all of parallel signals are used for controlling the elements other than the switching gate unit in the node apparatus of FIG. 1.

Other controls including completion of communication are carried out by monitoring a signal carried on the main singal line a. It is not necessary to monitor signals carried on the auxiliary signal line b. However, it may also be so structured to monitor signals carried by both of main and auxiliary signal lines a and b. In this case, if it is so structured that an end or completion of communication is determined by detecting the fact that all of signals have disappeared from all of the signal lines which are used for parallel communication at the same time and the switching gate unit 40 initiates its operation upon receipt of a signal from either one of these signal lines, a control input regarding the output port to other units than the switching gate unit 40 may be defined by a logical sum of all of the input signal lines from the input port as shown in FIG. 5. In this structure, a logical sum between the two signal lines a and b for parallel transmission is determined at an OR gate 220 whose output is supplied to other units than the switching gate unit 40, e.g., control gate unit 50 and end control unit 70, as a control input thereof regarding the output port.

By expanding or contracting the above-described structure in accordance with the number of signal lines to be used for parallel communication, the above-described structure may be adjusted to parallel communication using a desired number of signal lines. For example, the switching gate unit 40 may be constructed to be detachably mounted in the node apparatus 10 and a plurality of switching gate units 40 having different numbers of input and output channels or sub-ports may be provided to thereby allow a selected one of the switching gate unit 40 having a desired number of input and output channels or sub-ports to be detachably mounted in the node apparatus 10. In this structure, the node apparatus 10 may be adjusted to a parallel communication scheme which uses a particular number of signal lines for parallel communication.

Therefore, in accordance with the present invention, a parallel data may be transmitted through the present node apparatus as it is and without temporary conversion to a corresponding serial data. The present invention may also be advantageously applied not only to the OSI physical layer network layer of a local area network, but also to a network or a network control of a public communication network.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A node apparatus for use in a communication network having a plurality of nodes in which a communication path is shared by a plurality of terminals, comprising:
   an input port including a plurality of units, each unit being defined by n number of input channels including a main input channel for use in connection control of said unit;
   an output port including a plurality of units, each unit being defined by n number of output channels which correspond to the input channels of said input port;
   connecting means for connecting the input channels of said input port to the output channels of said output port; and
   control means for controlling said connecting means to connect said input channels to said output channels selectively, wherein upon detecting a first main input channel which has received a first input signal in the first place among the main input channels of the respective units, said control means controls said connecting means to have said first main input channel connected to a corresponding output channel of each unit, said control means monitoring whether or not a second input signal has been received within a first predetermined time period after elapsing of a second predetermined time period as from the receipt of said first input signal, whereby if a second input signal has been received within the first predetermined time period, said control means detects the main input channel which has received said second input signal as a second main input channel, connects all of the input channels of the units including said first main input channel to all of the output channels of the units which correspond to the unit including the second main input channel, and connects all of the input channels of units including the second main input channel to all of the output channels of the units which correspond to the unit including the first main input channel.

2. The node apparatus of claim 1, wherein, upon detecting of a first main input channel which has received a first input signal in the first place among the main input channels of respective units, said control means controls the connecting means to have said first main input channel connected to a corresponding output channel of each unit excepting an output channel corresponding to the first main input channel.

3. The node apparatus of claim 1 or 2, wherein said control means carries out connections of other input channels of the unit including said main input channel in synchronism with connection of said first and second main input channels.

4. The node apparatus of claim 1 or 2, wherein said control means controls termination of communication while monitoring the main input channel of each unit.

5. The node apparatus of claim 4, wherein said control means monitors said main input channel to thereby control a completion of communication.

6. The node apparatus of claim 4, wherein said control means monitors all of said plural number of input channels to thereby control a completion of communication.

7. The node apparatus of claim 1, wherein said connecting means is detachably mounted to said node apparatus and thus is replaceable with another connecting means having a different number of input and output channels.

* * * * *